April 25, 1950 H. A. GEHRES 2,504,973
ENGINE EXHAUST CHAMBER CONSTRUCTION
Filed Aug. 18, 1945 3 Sheets-Sheet 1

INVENTOR.

April 25, 1950

H. A. GEHRES 2,504,973

ENGINE EXHAUST CHAMBER CONSTRUCTION

Filed Aug. 18, 1945

INVENTOR.
Hewitt A. Gehres
BY
Ward Crosby & Neal
Attys

April 25, 1950   H. A. GEHRES   2,504,973
ENGINE EXHAUST CHAMBER CONSTRUCTION
Filed Aug. 18, 1945   3 Sheets-Sheet 3
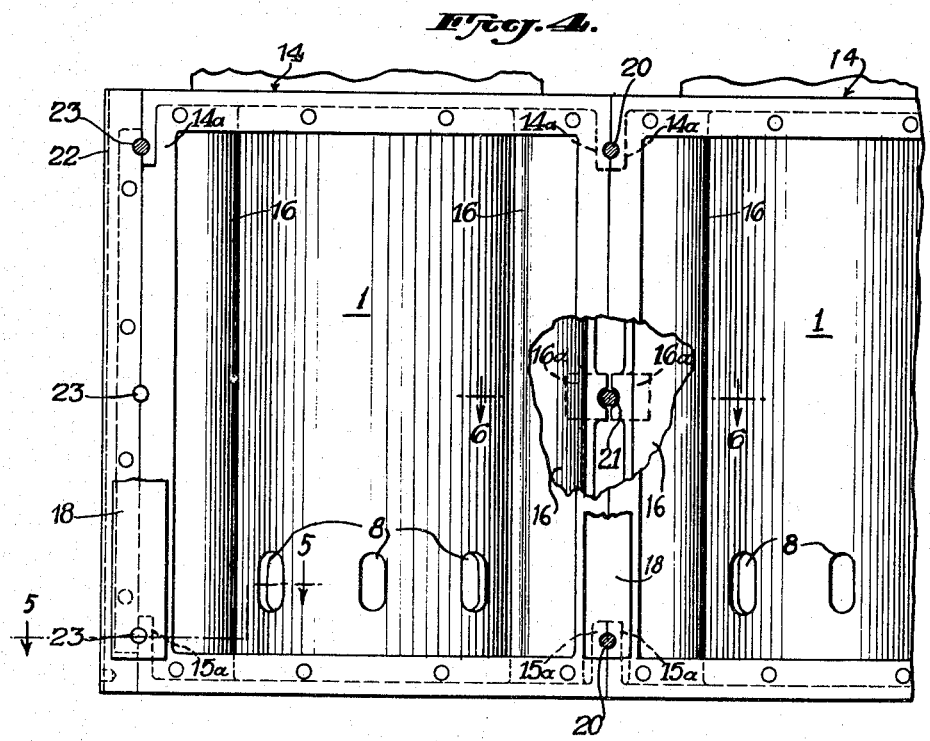
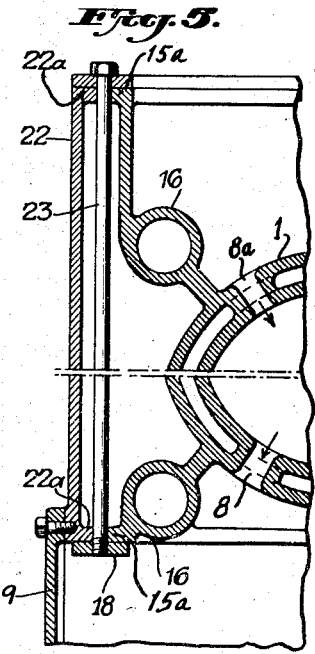
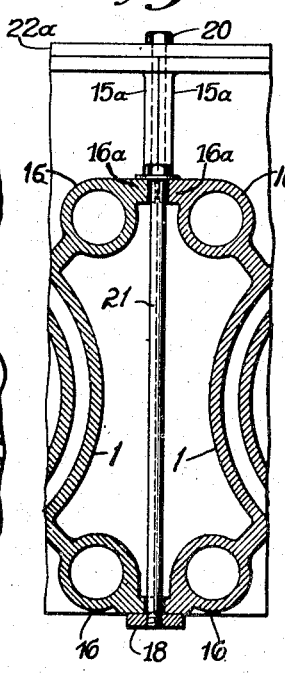
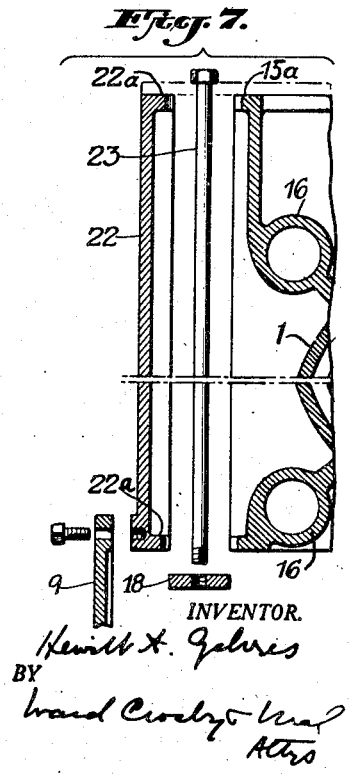
INVENTOR.
Hewitt A. Gehres
BY
Attys Patented Apr. 25, 1950

2,504,973

UNITED STATES PATENT OFFICE 2,504,973

ENGINE EXHAUST CHAMBER CONSTRUCTION

Hewitt A. Gehres, Mount Vernon, Ohio, assignor to The Cooper-Bessemer Corporation, Mount Vernon, Ohio, a corporation of Ohio Application August 18, 1945, Serial No. 611,345

3 Claims. (Cl. 123—195)

The invention relates to multi-cylinder internal combustion engines of the type wherein adjacent banks of cylinders are mounted upon a common frame, and is concerned particularly with an exhaust chamber construction provided to receive the highly heated gases which are exhausted from the cylinders. In engines of the above type it has been customary to provide water-cooled exhaust manifolds carried by the cylinder structure and provided with individual branch connections communicating respectively with the exhaust gas passageways of the several cylinders, a type of construction which is expensive and space consuming since it requires a large area and volume of additional water-cooled chambers, piping connections and the like which are expensive both to construct and to install.

The invention aims primarily to provide an exhaust chamber construction for engines of the above character which will largely reduce the amount of extra water-cooled walls, partitions, piping connections and the like, which must be added to the engine to make up the exhaust gas receiving chamber. In accordance with the present invention the space between adjacent banks of cylinders is utilized as the exhaust gas receiving chamber, and the adjacent water jacketed side wall portions of the cylinders making up the adjacent banks, serve also as water-cooled side wall portions for the exhaust gas receiving chamber. The adjacent engine framework may serve as the bottom wall of the exhaust chamber, its top wall may be constituted by a cover overlying the space between the adjacent banks near the tops of the cylinders, and end wall members are provided to close in the exhaust chamber at the ends of the banks. These end and top members may be readily water-cooled when required by including them in the cylinder cooling system. In instances where the walls of adjacent cylinders in the banks are spaced from each other longitudinally of the assembly, these spaces are sealed by partition members, the above mentioned parts constituting a complete housing for an exhaust gas receiving chamber which serves both of the adjacent banks of the cylinders. The invention has particular advantage as applied to two cycle engines wherein the highly heated gases are exhausted at the sides of the cylinders, the exhaust passages from both banks of cylinders passing through their adjacent cylinder wall portions and delivering directly into the exhaust gas receiving chamber without the need of intermediate manifold connections.

Further objects and advantages of the invention will be in part obvious and in part specifically referred to in the description hereinafter contained which, taken in conjunction with the accompanying drawings, discloses the invention as applied to a multi-cylinder two cycle gas engine of the V type. The disclosure however should be understood as merely illustrative of the invention in its broader aspects.

In the drawings,

Fig. 4 is a partial side elevational view, with certain parts cut away, looking from within the exhaust chamber toward one of the banks of cylinders;

Fig. 5 is a sectional view taken substantially along the line 5—5 of Fig. 4;

Fig. 6 is a sectional view taken substantially along the line 6—6 of Fig. 4;

Fig. 7 is an exploded partial sectional view of one end of a cylinder bank.

Many of the parts of the illustrated engine with which parts the present invention is not particularly concerned, may be understood as of any known or appropriate construction, and accordingly will not be described herein, or only briefly adverted to.

Figure 1:
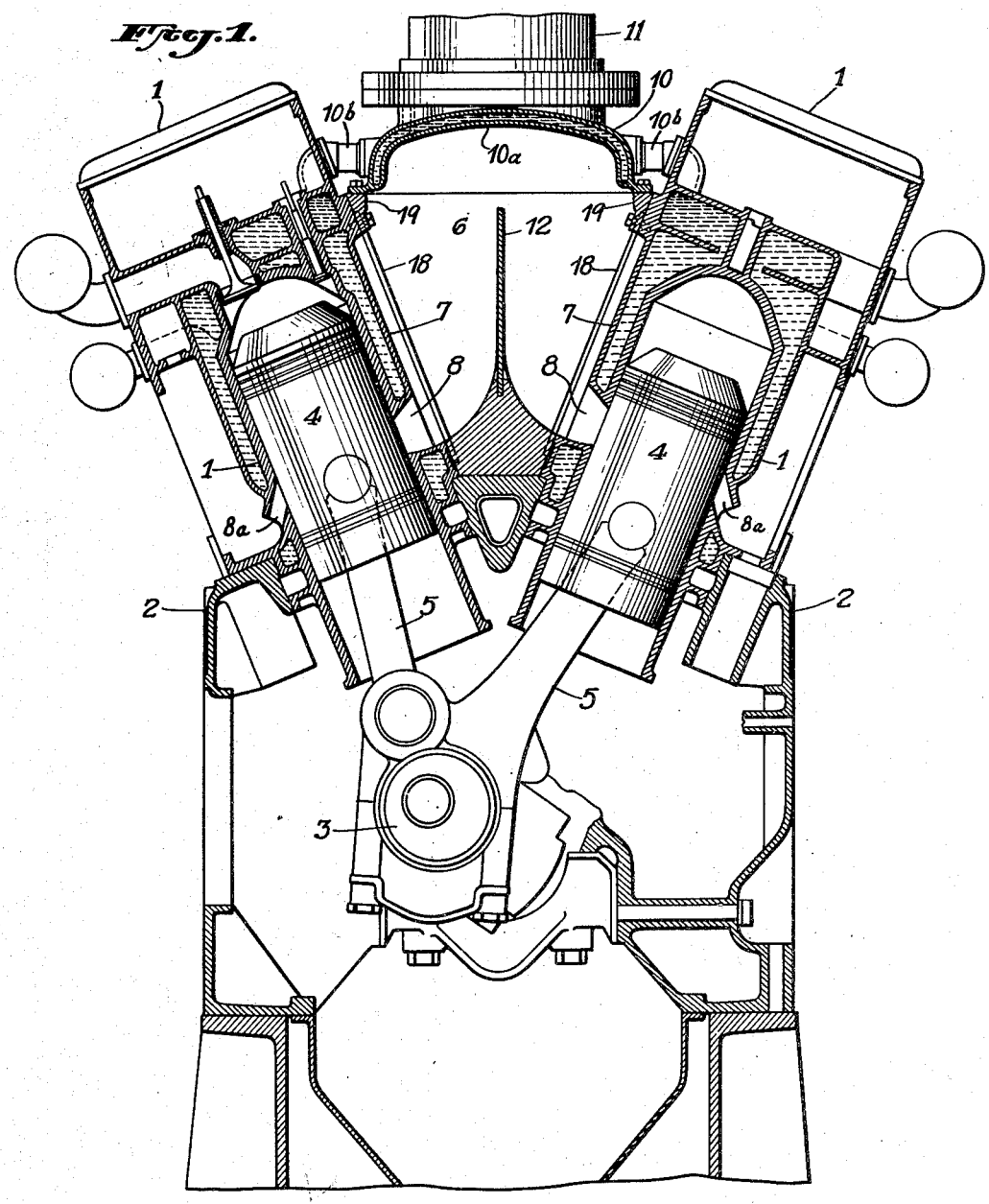
Fig. 1 is a vertical sectional view showing the invention as applied to a two cycle Diesel engine.

Fig. 1 shows the general assembly of a V type two cycle gas engine including two banks of cylinders 1 mounted upon a main supporting frame 2 which encloses the crank shaft 3 connected to the pistons 4 by connecting rods 5. The exhaust gas receiving chamber 6 occupies the space between the adjacent banks of cylinders 1, in such manner that the adjacent water-cooled walls 7 of the two banks constitute water-cooled side wall portions of the exhaust gas receiving chamber 6. The highly heated exhaust gases from the various cylinders are conducted into chamber 6 through appropriate passages, and in the case of a two cycle engine as illustrated, the construction becomes very simple since it is only necessary to provide exhaust ports 8 which open directly into chamber 6 through the water-cooled cylinder side walls 7 which are located at the adjacent sides of the two banks. The inlet ports are indicated in Fig. 1 at 8a. The valve constructions for admitting the fuel and air will not be described, since the invention is not particularly concerned therewith.

The exhaust gas chamber 6 is provided with opposite end wall members or plates 9 (Fig. 2) which close in the spaces between the end cylinders of the banks, and a top cover 10 (Figs. 1 and 3) which overlies the space between the cylinder banks. In the above manner a water-cooled exhaust gas receiving chamber of the large capacity which is desirable for engines of of the type under discussion, is provided without adding substantially to the displacement of the assembly and with but few additional large parts. The exhaust gases may be conducted away from chamber 6 at any convenient point, a pipe 11 leading from the cover 10 being shown at the top of Fig. 1 for this purpose. The illustrated form also includes a baffle plate 12 extending upwardly in chamber 6 and carried by a longitudinal frame member 13 which is interposed between the two banks of cylinders, this construction serving to prevent the exhaust gases passing through ports 8 from driving directly through the exhaust chamber 6 to the opposite ports.

In engines of the type under discussion, the cylinder constructions proper which make up the banks are usually spaced from each other longitudinally of the assembly, so that the water-cooled side wall portions 7 of the cylinders do not make up the complete side walls of the exhaust chamber 6. The illustrated form of the invention includes additional partition members which are provided to complete these side walls. As shown the various cylinders are each provided with upper rectangular flange members 14 and lower flange members 15, the adjacent flanges of adjacent cylinders substantially abutting when the cylinders are in assembled relation. Each cylinder is also provided with a plurality of webs 16 (Fig. 4) extending between the upper and lower flanges 14 and 15, and projecting out from the cylinder side walls proper to points adjacent the abutting corners of the respectively adjacent flanges 14 and 15. These webs 16 partially seal the spaces between adjacent cylinders, but leave between them rectangular gaps 17 (Fig. 4) which are sealed by sealing strips 18 (Fig. 6). In the form shown, the sealing strips are received at their bottoms in recesses in central frame member 13 at the bottom of chamber 6, and at their tops the sealing strips 18 are received within recesses in rails 19 (Figure 1) which run along the upper portion of each of the banks of cylinders. To clamp the sealing strips 18 against the adjacent surfaces of the webs 16 and the adjacent corners of the upper and lower flange members 14 and 15, bolts 20 are shown as passing between lugs 14a on the adjacent flange members 14, and lugs 15a on the lower flange members 15 (see Fig. 4), these bolts seating at their threaded ends in the sealing strips 18. Further bolts 21 (see Figs. 3, 4 and 6) are shown as received between lugs 16a located at the intermediate portions of the webs 16, and are similarly seated in the strips 18. These bolts 20 and 21 being accessible from the outer sides of the banks of cylinders, permit any given cylinder member to be detached from its adjacent sealing strips 18 and removed, without disturbing the remainder of the exhaust chamber construction.

To conveniently accommodate the end wall members 9, the end cylinders of each bank may be provided with an end cover 22 (see Figs. 5 and 7) having lugs 22a complementary to the lugs 14a and 15a above described, through bolts 23 being employed as shown in Figs. 5 and 7 to pass between the end covers 22 and their adjacent cylinders, and seat against further sealing strips 18 which are provided at the ends of the outer cylinders of the banks. The end wall members 9 may then be bolted to these end covers 22, as shown in Figs. 2 and 5.

Figure 2:
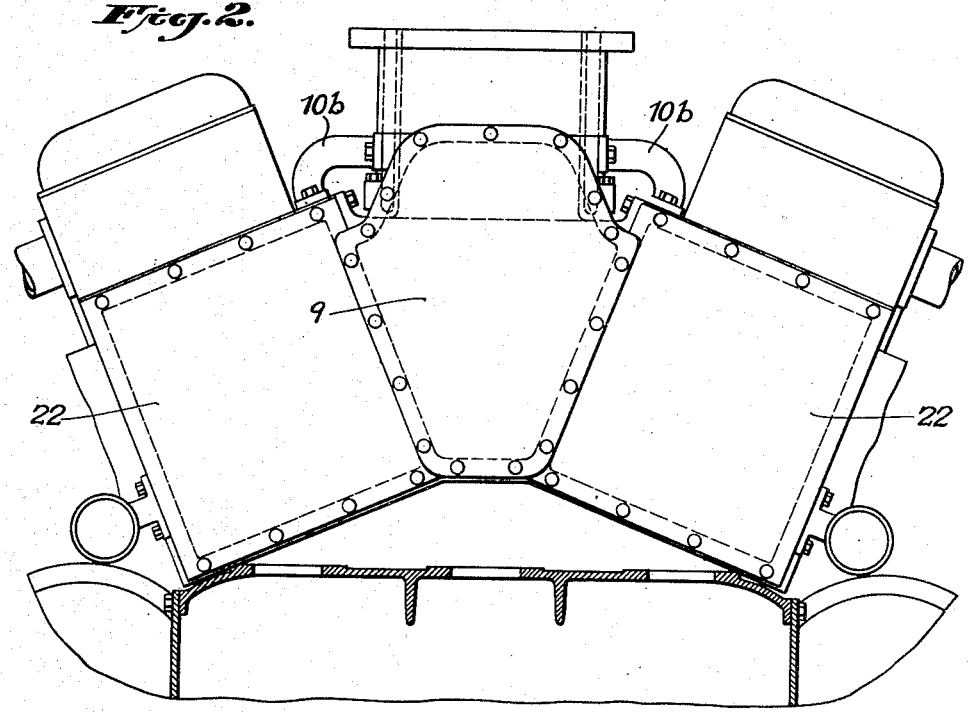
Fig. 2 is a front elevational view showing one of the end wall plates in position upon the engine.
Figure 3:
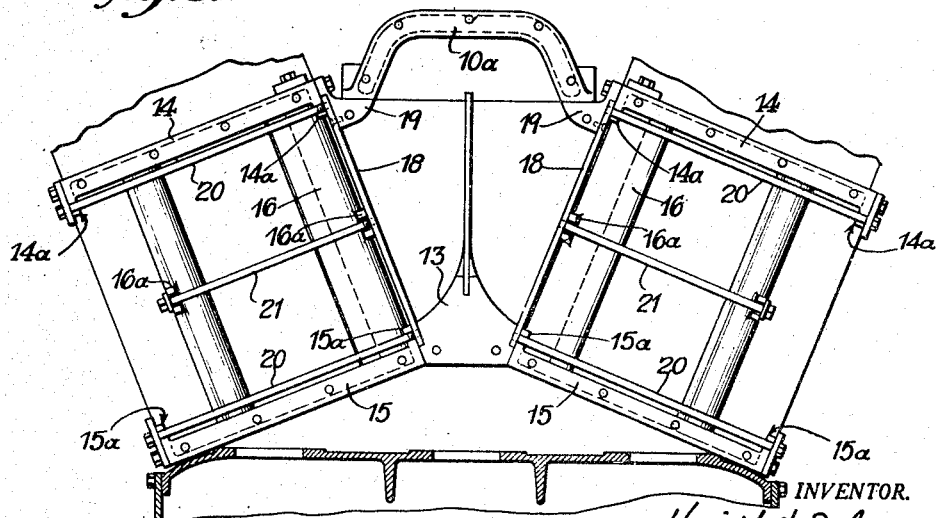
Fig. 3 is a vertical cross-sectional view taken between adjacent cylinders of the two banks.

The top cover 10, as shown in Figs. 1 and 3, may seat at its sides upon the rails 19 above described, and have its ends bolted to the end wall members 9 as shown in Fig. 2. In the illustrated form as shown in Fig. 3 the cover 10 is provided with water jacket space 10a, which may be connected to the water cooling system for the cylinders by pipes 10b as shown in Fig. 2.

While the invention has been disclosed as carried out by the above described specific construction it should be understood that changes may be made therein without departing from the invention in its broader aspects, within the scope of the appended claims.

1. A multi-cylinder internal combustion engine of the character described having a supporting frame, adjacent rows of cylinders mounted upon said frame, an exhaust gas receiving chamber located in the space between said adjacent rows of cylinders, said cylinders having inner and outer enclosing side walls spaced to provide water jacket spaces therebetween, means for circulating cooling liquid through said jacket spaces, the facing outer side wall portions of said rows of cylinders constituting opposite sidewall portions of said exhaust gas chamber, the side walls of said cylinders also having exhaust ports therein which open directly through said facing side wall portions into said exhaust gas chamber, said exhaust gas chamber having opposite end wall members closing the spaces at the ends of the rows of cylinders and a top cover member overlying the space between the rows of cylinders.

2. A multi-cylinder internal combustion engine of the character described having a supporting frame, adjacent rows of cylinders mounted upon said frame, an exhaust gas receiving chamber located in the space between said adjacent rows of cylinders, said cylinders having inner and outer enclosing side walls spaced to provide water jacket spaces therebetween, means for circulating cooling liquid through said jacket spaces, the facing outer side wall portions of said rows of cylinders constituting opposite sidewall portions of said exhaust gas chamber, the side walls of said cylinders also having exhaust ports therein which open directly through said facing side wall portions into said exhaust gas chamber, the cylinders of the respective rows being spaced from each other longitudinally of the rows and the side wall portions of adjacent cylinders being provided with partition members extending therebetween to seal said exhaust chamber at the sides, said exhaust gas chamber having opposite end wall members closing the spaces at the ends of the rows of cylinders and a top cover member overlying the space between the rows of cylinders.

3. A multi-cylinder internal combustion engine of the character described having a supporting frame, adjacent rows of cylinders mounted upon said frame, an exhaust gas receiving chamber located in the space between said adjacent rows of cylinders, said cylinders having inner and outer enclosing side walls spaced to provide water jacket spaces therebetween, means for circulating cooling liquid through said jacket spaces, the facing outer side wall portions of said rows of cylinders constituting opposite sidewall portions of said exhaust gas chamber, the side walls of said cylinders also having exhaust ports therein which open directly through said facing side wall portions into said exhaust gas chamber, adjacent cylinders of said rows being spaced apart but having abutting upper and lower flange members and webs extending between said flange members to partially close off the spaces between adjacent cylinders, sealing plates engaging adjacent webs to seal the spaces therebetween and thereby seal said exhaust chamber at the sides, said exhaust gas chamber having opposite end wall members closing the spaces at the ends of the rows of cylinders and a top cover member overlying the space between the rows of cylinders.

HEWITT A. GEHRES.

REFERENCES CITED

The following references are of record in the file of this patent:

UNITED STATES PATENTS

| Number | Name | Date |
| --- | --- | --- |
| 2,067,253 | Wohanka | Jan. 12, 1937 |
| 2,113,077 | Buchi | Apr. 5, 1938 |
| 2,260,975 | Hvid | Oct. 28, 1941 |
| 2,306,580 | Wilson | Dec. 29, 1942 |
| 2,346,463 | Szekely | Apr. 11, 1944 |